US008978149B2

(12) United States Patent
Barraclough et al.

(10) Patent No.: US 8,978,149 B2
(45) Date of Patent: Mar. 10, 2015

(54) MEDIA CONTENT DEVICE, SYSTEM AND METHOD (75) Inventors: Keith Barraclough, Mountain View, CA (US); David Irvine, San Jose, CA (US); Melanie Larson, Mountain View, CA (US); Morgan P. Guenther, Sausalito, CA (US); Gerri Johnson, New York, NY (US)

(73) Assignee: Next Issue Media, Menlo Park, CA (US)

( * ) Notice: Subject to any disclaimer, the term of this patent is extended or adjusted under 35 U.S.C. 154(b) by 0 days.

(21) Appl. No.: 13/415,157

(22) Filed: Mar. 8, 2012

(65) Prior Publication Data

US 2012/0297490 A1  Nov. 22, 2012

Related U.S. Application Data (60) Provisional application No. 61/487,111, filed on May 17, 2011.

(51) Int. Cl.
*G06F 21/00* (2013.01)
*H04L 29/06* (2006.01)
*G06F 21/10* (2013.01)
*G06F 17/30* (2006.01)
*H04K 1/00* (2006.01)

(52) U.S. Cl.
CPC ..................................... *G06F 21/10* (2013.01)
USPC ............ 726/26; 709/224; 705/14; 705/14.64; 707/100; 707/748; 713/200

(58) Field of Classification Search
USPC .................... 726/26; 709/224; 705/14.64, 14; 713/200; 707/748, 100
See application file for complete search history.

(56) References Cited

U.S. PATENT DOCUMENTS

| 6,199,082 | B1 | 3/2001 | Ferrel et al. | |
| 6,574,629 | B1 | 6/2003 | Cooke, Jr. et al. | |
| 7,908,358 | B1 * | 3/2011 | Prasad et al. | 709/224 |
| 2002/0035697 | A1 * | 3/2002 | McCurdy et al. | 713/200 |
| 2004/0003351 | A1 | 1/2004 | Sommerer et al. | |

(Continued)

FOREIGN PATENT DOCUMENTS

WO  WO 2008097624 A3 * 10/2008

OTHER PUBLICATIONS

Yonggang Wen; Xiaoqing Zhu; Rodrigues, J.J.P.C.; Chang Wen Chen; "Cloud Mobile Media: Reflections and Outlook"; Multimedia, IEEE Transactions on vol. 16 , Issue: 4; DOI: 10.1109/TMM.2014.2315596; Publication Year: Jun. 2014; pp. 885-902.*

(Continued)

*Primary Examiner* — Andrew Nalven
*Assistant Examiner* — Courtney Fields
(74) *Attorney, Agent, or Firm* — Crawford Maunu PLLC (57) ABSTRACT Media content is provided using metric-apportioning. In accordance with one or more embodiments, remote-user interface circuits are authenticated and remote access is provided to different sets of media content via the interface. For each authenticated interface and a time-based period during which the interface accesses the media content, time-stamped usage data that characterizes use of the media content at the interface is communicated therewith. A usage metric characterizing usage of the media content is apportioned based upon the time-stamped usage data and stored weighting factor data for the media content.

31 Claims, 3 Drawing Sheets

(56) References Cited

U.S. PATENT DOCUMENTS

| | | |
|---|---|---|
| 2004/0199527 A1* | 10/2004 | Morain et al. ................ 707/100 |
| 2006/0048043 A1 | 3/2006 | Kikuchi |
| 2006/0294051 A1 | 12/2006 | Kapadia et al. |
| 2006/0294578 A1 | 12/2006 | Burke et al. |
| 2007/0070442 A1 | 3/2007 | Ohkubo |
| 2008/0109306 A1* | 5/2008 | Maigret et al. .................. 705/14 |
| 2009/0030792 A1 | 1/2009 | Khivesara et al. |
| 2009/0138357 A1* | 5/2009 | Riggs .............................. 705/14 |
| 2009/0216623 A1 | 8/2009 | Hendricks et al. |
| 2009/0259971 A1 | 10/2009 | Rankins et al. |
| 2009/0319925 A1 | 12/2009 | Katinsky et al. |
| 2010/0094878 A1* | 4/2010 | Soroca et al. ................ 707/748 |
| 2010/0175090 A1 | 7/2010 | Cordray |
| 2010/0325086 A1 | 12/2010 | Skinner et al. |
| 2011/0080843 A1 | 4/2011 | Casey et al. |
| 2011/0099071 A1* | 4/2011 | Johnson ..................... 705/14.64 |

OTHER PUBLICATIONS

Kon, M., et al., "A New Digital Future for Publishers?", Oliver Wyman, Media Entertainment and Leisure, www.oliverwyman.com. Aug. 2010.

Chorianopoulos et al. "Cross Media Digital Rights Management for Online Stores" [online]. In: Proceedings of the First Int'l Conference on Automated Production of Cross Media Content for Multi-Channel Distribution 2005.

Sathish. "Delivery Context Access for the Mobile Web" [online]. Dated May 2007. Retrieved at: http://tutkielmat.uta.fi/pdf/lisuri00064.pdf.

* cited by examiner

MEDIA CONTENT DEVICE, SYSTEM AND METHOD

RELATED PATENT DOCUMENTS

This patent document claims the benefit under 35 U.S.C. §119 of U.S. Provisional Patent Application Ser. No. 61/487,111, filed on May 17, 2011; this patent document and its Appendix are fully incorporated herein by reference.

BACKGROUND

Many media categories, such as music, home video, books, and television, have been substantially impacted by the advent of digital distribution. To date, the availability of free content on the interne has diluted publishers' ability to sell print products. This has contributed to print advertising declines, and online advertising has not made up for the loss. Some industry observers foresee a continuing and inevitable slow decline in revenues, based on value migration to tech players, similar to the decline in other media sectors.

In addition to the above, the ability to provide content in a manner that is scalable, usable and readily valued/attributed has been challenging. For example, media content is provided using a myriad of different delivery approaches, and to end-user devices that vary tremendously from user to user, and also change dramatically over time as technology evolves.

These and other aspects have presented challenges to the presentation, delivery and management of media content.

SUMMARY

Aspects of the present disclosure are directed to presenting media content to users, such as via mobile (e.g., hand-held) devices, stand-alone computers, mobile computers, televisions and other displays, and navigation systems. In various implementations, media content pertains to subscription-type content, as may be associated with one or more of a variety of content sources. Available content types and/or subscription types are provided to users via an interface, from which content can be accessed. Various embodiments are directed to the control of content access based upon attributes of one or more of a user attempting to access the content, an owner of the content and characteristics of one or more of a device and system used to access the content. In some implementations, the content pertains to a digital or print-type magazine that offers the content to subscribers, who are provided access as discussed herein.

In accordance with another example embodiment, an apparatus processes authentication criteria communicated from remote-user interface circuits with stored authentication data to authenticate remote-user interface circuits, and for each authenticated remote-user interface circuit, provides remote access to different sets of media content via the remote-user interface circuit based upon stored media content authorization data associated with the remote-user interface circuit. The apparatus further communicates with each authenticated remote-user interface circuit to receive time-stamped usage data that characterizes use of the media content at the remote-user interface circuit, and apportions a usage metric characterizing usage of the respective sets of media content based upon stored weighting factor data for each set of media content and the time-stamped usage data, for a time-based period during which the remote-user interface circuit accesses the different sets of media content.

Another embodiment is directed to a reader-type apparatus as may, for example, be implemented with one or more modules operative in a portable hand-held device. The apparatus interfaces with a remote content-providing circuit over a network communication link, provides authentication criteria to the content-providing circuit, and receives media content access information from the content-providing circuit. The content access information is indicative of content available at the apparatus based upon the authentication criteria. The apparatus further presents the media content access information for interaction by a user, identifies a set of media content for local access at the apparatus based upon user input, retrieves the identified set of media content from the content-providing circuit via the first module, and presents the retrieved media content for access by the user. The apparatus also collects time-stamped usage data that characterizes the user's access to the presented retrieved media content, and communicates data corresponding to the collected time-stamped usage data to the content-providing circuit via the first module based upon a trigger event at the apparatus.

Another example embodiment is directed to a method in which media content is provided to remote-user interface circuits, which are authenticated by processing authentication criteria communicated from the remote-user interface circuits with stored authentication data. For each authenticated remote-user interface circuit, remote access is provided to a plurality of different sets of media content via the remote-user interface circuit, based upon stored media content authorization data associated with the remote-user interface circuit. For each authenticated remote-user interface circuit and a time-based period during which the remote-user interface circuit accesses the different sets of media content, the remote-user interface circuit is engaged to obtain time-stamped usage data that characterizes use of the media content at the remote-user interface circuit. A usage metric characterizing usage of the respective sets of media content is apportioned based upon stored weighting factor data for each set of media content and the time-stamped usage data.

The above summary is not intended to describe each embodiment or every implementation of the present invention. The figures and detailed description that follow more particularly exemplify various embodiments.

FIGURES

One or more embodiments of the present disclosure may be more completely understood in consideration of the detailed description and in connection with the drawings, in which.

While the disclosure is amenable to various modifications and alternative forms, specifics thereof have been shown by way of example in the drawings. It should be understood, however, that the intention is not to limit the disclosure to the particular embodiments shown and/or described. On the contrary, the intention is to cover all modifications, equivalents, and alternatives falling within the scope of the present disclosure.

DETAILED DESCRIPTION

The present disclosure relates to media content, delivery and presentation, as well as circuits, devices and systems as described herein. While the present disclosure is not necessarily limited, aspects of the disclosure may be appreciated through a discussion of examples using these and other contexts. The following discussion, as well as that in the above-referenced provisional application that is incorporated herein, describes various exemplary embodiments without limitation to other related embodiments and/or subject matter herein.

Various example embodiments are directed to the presentation of a storefront-type computer interface using an interactive circuit via which users are presented with access to media content, and user selections/subscriptions are used in presenting the content. Media is presented to the user based upon stored data specifying user entitlement to media (e.g., authorization type criteria), with subscription and payment information provided and implemented to establish, add, or extend such entitlement. Various aspects are directed to apportioning a usage metric based on interactive communications with remote hand-held devices. The usage metric can be apportioned using one or more of a variety conditions as may relate to associations between content being accessed, type of access and weighting values for one or more sets of accessed content.

In some embodiments, user interaction with a reader module on a hand-held device is recorded as a stream of events. Each event is recorded as data describing an action that the user took, a current context, and a timestamp of the event. When the reader module has network connectivity, recorded events are uploaded to a host backend and provided for use in generating metric data, such as for apportioning a metric pertaining to usage of one or more sets of media content.

Metrics as discussed above are apportioned in a variety of manners, depending upon the application. In some embodiments, a user metric is apportioned using a time-based period during which a remote-user interface circuit accesses different sets of media content. Time-stamped usage data, which characterizes use of the media content at the remote-user interface circuit, is used together with stored weighting factor data for each set of media content to apportion the usage metric. The usage data may be characterized based upon, for example, one or more of: dwell time at the remote-user interface circuit during access of the media content, a background/foreground condition of the display of the media content at the remote-user interface circuit, and an awake/sleep status of the remote-user interface circuit.

In some implementations, the weighting factor is used with time-stamped usage data for all sets of media content accessed at the remote-user interface circuit. These approaches may, for example, be carried out by operating a circuit to execute an algorithm, using the weighting factor data and time-stamped usage data as inputs, to attribute respective portions of the usage metric to different sets of the media content during the time-based period.

In some embodiments, usage metrics are apportioned based upon a group, or tier, of media content being accessed. For example, different sets of media content may be attributed to different tiers, such as may pertain to tiers of magazine content that can be grouped based upon popularity or other valuation. For each authenticated remote-user interface circuit, a usage metric can be computed based upon a weighting factor for a media content tier with which a set of media content accessed at the remote-user interface circuit is associated. This approach is also implemented in instances for which different sets of media content accessed at a single device are associated with different tiers.

Fixed-value metrics are implemented with example embodiments in which a fixed (e.g., flat) metric or valuation is assigned to a particular type of media content access. For example, a user may be assessed a flat valuation metric for unlimited access to a set or group of sets of media content. In such an example, a usage metric as discussed herein is determined and used to attribute usage to different sets of media content. This information is then used for allocating resources from the fixed/flat valuation to providers of the content (e.g., providers receive a higher allocation based upon usage of their content, as well as any applicable weighting factors as may pertain, for example, to a value associated with the content and/or a quantity/frequency of the content).

Other embodiments are directed to group-based access in which multiple remote-user interface circuits are attributed to a common group. Usage metrics are apportioned for the group, based upon data pertaining to the respective devices within the group.

In a more specific embodiment, a usage metric as discussed herein is apportioned based upon a type of device accessing the media content. For example, where different devices access content in different formats (e.g., based on a display characteristic of the specific remote-user interface circuit to which the content is provided), a usage metric is apportioned based upon the format. This approach can be implemented to apportion a lower metric value for media content access provided on a device with limited functionality, relative to a metric value for media content access provided on a device with higher functionality.

Media content is provided/delivered using one or more of a variety of approaches. In some embodiments, portions of a particular set of media content are delivered separately, such as by providing access to a particular article in a magazine. This approach can be carried out without providing access to an entire set of media contents, such as by delivering only those articles in a magazine that a user wishes to view to an end-user device. In certain applications, an entire set of media content, such as an entire magazine, can be delivered to an end-user device for access without necessarily requiring connectivity to a media content source (e.g., via the internet).

In some embodiments, a table of contents is delivered to an end user device, and articles within a magazine are delivered upon selection from the table of content. In certain implementations, media content is automatically loaded (e.g., via a network connection) to an end-user device based upon user preferences and/or history. For instance, if a particular user often views a certain portion of a magazine (e.g., a particular editorial column), that portion can be automatically delivered to the user's device.

In various example embodiments, periodical-based media content is delivered non-linearly to remote-user interface circuits. This non-linear delivery involves delivering ordered content from a periodical, in an out-of-order fashion. For instance, where a magazine-type periodical has articles traversing several pages in order, non-linear delivery involves delivering at least one article (or portion thereof) out of the order in which the content is presented in the periodical in a manner such as described above. In some implementations, the non-linear delivery is provided based upon historical access to previous versions of the periodical-based media content by a user associated with authentication criteria upon which the access is based, such as by delivering content to a user's device based upon previous access (e.g., if a user historically accesses an editorial from a periodical first, prior to accessing other portions of the periodical, the editorial can be provided ahead of other earlier portions of the periodical).

Another example embodiment is directed to a circuit-based module that, for each set of media content to which access is provided at remote-user interface circuits, configures the display of the media content based upon at least one display characteristic of the remote-user interface circuit to which the content is provided, and display configuration data assigned to the media content. This module (and approach) can be implemented, for example, to ensure content can be displayed at a particular end device, and further to ensure that the content is displayed according to requirements of a content provider. Such display characteristics may include, for example, a data format requirement of the remote-user interface device, a display size of the remote-user interface device, display preference requirements specified for the provision of the media content to remote-user interface devices, and integrated third-party data to be displayed with the media content at the remote-user interface device.

Another example embodiment is directed to a reader-type device, as may be implemented with a remote end-user device. The reader-type device interfaces with a remote content-providing circuit over a network communication link (e.g., a wireless network link), to provide authentication criteria and receive media content access information. This information is presented (e.g., displayed) to a user accessing the reader, from which the user can select content for access, such as by using a touch-screen at the reader-type device. The selected content is provided for access by the user, which access is monitored to collect time-based usage data that characterizes the user's access. This usage data is implemented for apportioning a metric relating to the media content. Such a metric can be used, for example, to attribute a portion of a value to a particular access to the media content. In addition, the metric may be apportioned in one or more of a variety of manners, such as those discussed above involving weighting or tier-based data.

The amount of content stored at an end-user device is also varied in accordance with certain embodiments, depending upon the application and available space. In one embodiment, an application running on an end-user device determines how much storage space is available for requested content, and interacts with the end-user device to delete other content if sufficient space is not available.

Figure 1:
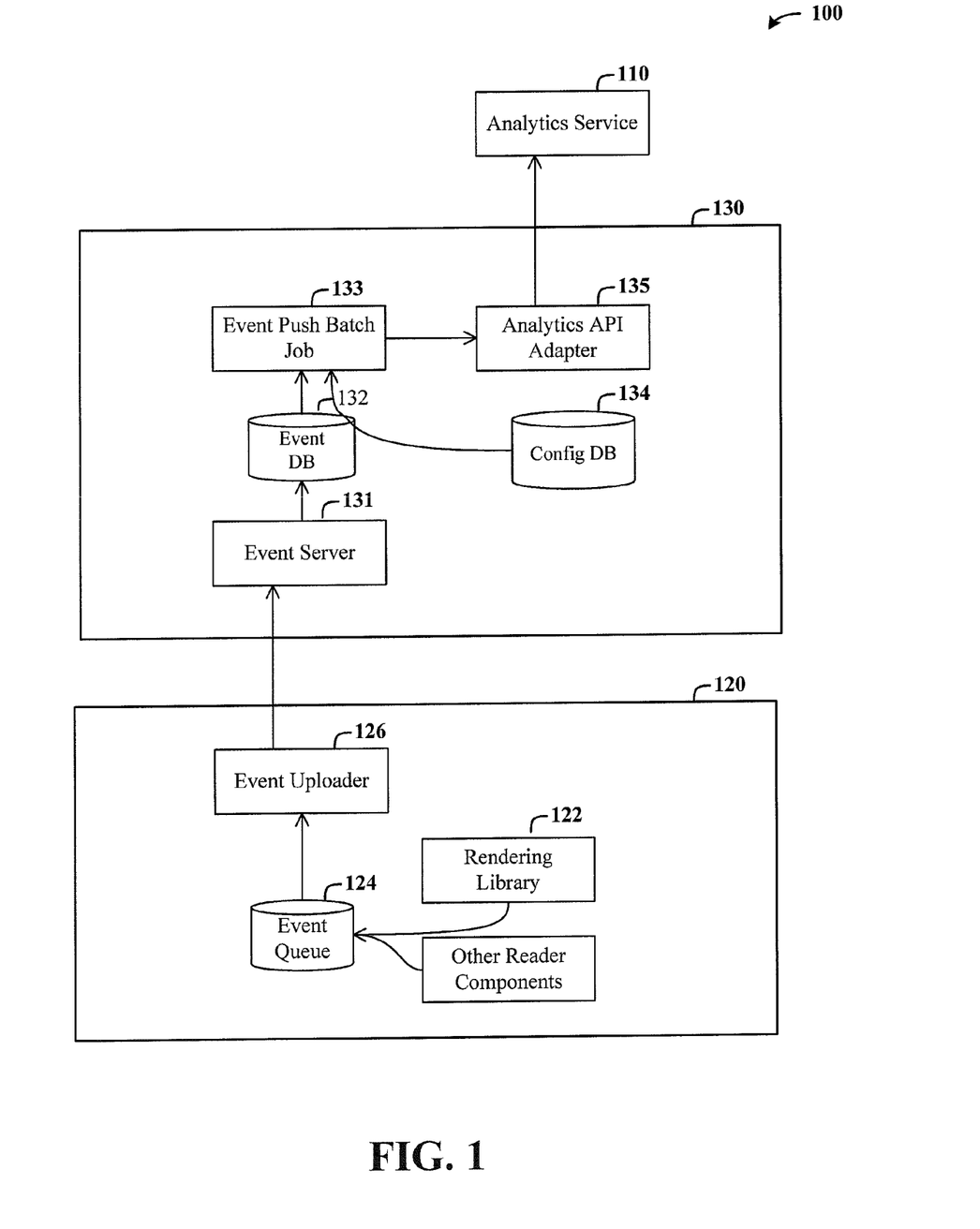
FIG. 1 shows a content-provisioning system with respective modules that may be implemented separately or in combination with one or more modules, in accordance with an example embodiment of the present invention.

Turning now to the figures, FIG. 1 shows such a content-provisioning system 100, as well as an analytics module 110, a reader module 120 and a backend module 130 that may be implemented separately and/or with the system 100, in accordance with another example embodiment. The analytics module 110 may be implemented with a web-type analytics service, such as a third party web analytics service from Google (Mountain View, Calif.) and Omniture (Orem, Utah) that can be implemented via exposure of an HTTP(S) API.

The reader module 120 operates on a remote user device such as a mobile telephone, tablet or other computing device, and can be implemented using one or more of a variety of operating systems, such as may be implemented on laptop computers, mobile telephones, tablet devices and others. The reader module may be effected using various components, and in one implementation includes a rendering library module 122, event queue module 124 and an event uploader module 126. The rendering library module 122 renders content for access at the remote user device, handles user interaction events, and captures and writes events to an event queue (via the event queue module 124). In some implementations, the reader module 120 also includes a placeholder module for one or more event generating components. The event queue module 124 provides persistent storage for events that have been captured by either the rendering library module or other reader components. The event uploader module 126 periodically examines the remote device's network connectivity status and the events currently in the event queue. If the remote user device has network connectivity and there are events in the event queue, the event uploader module 126 attempts to upload the events to the backend module 130. Once events have been uploaded to the backend module 130, the event uploader module 126 removes the events from the event queue. The reader module 120 is configurable with a network address of the event server module, to facilitate such interaction/communication.

The backend module 130 includes a collection of components including an event server module 131, an event database module 132, an event push batch job module 133, a database configuration module 134, and an analytics adapter module 135. The event server module is a web-based module that accepts events as they are uploaded from an event uploader module. Once received, the events are written to an event database via the event database module, which provides persistent storage for events that have been received from reader modules (e.g., and have not been uploaded to an analytics service module).

The event push batch job module periodically examines the contents of the event database for events that need to be pushed to an analytics service module. As events are retrieved from the event database they are grouped by publisher and title. For example, with each publisher/title combination for accessed content, appropriate analytics service information is retrieved from the configuration database. Using this information, the event push batch job module instantiates a correct analytics API adapter and pushes the events to an analytics service module. The configuration database module stores data useful for determining which analytics service module should be pushed to, and any associated configuration options with regard to data such as usage metric data for content (e.g., for each particular publisher's title).

The analytics API adapter module provides a translation layer between the event push batch job and an API exposed by an analytics service module. Accordingly, an analytics API adapter module is implemented for each analytics service module (e.g., type) that is supported.

The event data module collects events having a common set of attributes in addition to attributes specific to the event type. In a particular embodiment, attributes specific to a certain event type are encoded as a JSON object and associated with an event_data attribute, with exemplary attributes listed as follows:

timestamp string: UTC timestamp in ISO 8601 format of when the event was captured.
user_id string: Identifier of the user that initiated the event. If not applicable use an empty string.
title_id integer: Identifier for the title that was being read when the event occurred. If not applicable use 0.
event_type integer: Identifier for the type of event that occurred.
event_data string: JSON encoded attributes specific to the event type. If no additional attributes then use empty string.

In some embodiments, events are uploaded to the event server module using an HTTP(S) POST request. Receipt of a 200 OK HTTP response from the event server module can be used as an indication that events have been received and can be removed from the event queue. The request body contains zero or more events encoded as a JSON array with a content type of application/json.

In some implementations, the event uploader module breaks events into groups and uploads the events in respective groups, to facilitate communication. Using this approach (relative, for example, to uploading all events at once), a smaller number of events need to be re-uploaded in the event that network connectivity is lost during an upload.

In various embodiments, a host system facilitates cross-title interactive media content access, to deliver media content that can be presented at a variety of different types of display devices. Various implementations are directed to the delivery of digital magazine content that can be accessed via tablet, smartphones, desktop/laptop computers, TVs and other electronic devices. Digital magazine content can be provided via subscription, single item purchase and upgrade/discount bundling with other physical goods such as existing print magazine subscriptions.

In some implementations, dynamic offer management functions are effected via cross title usage, interest and sales, to tailor offers to specific users or specific types of users. Offers may be rotated based on time, recommendation or other external events. Magazines, applications and special offers can be delivered through a storefront application type system as presented to a user via electronic devices. Sales can be made as a part of a subscription, bundle or single item using the user's system account.

In various implementations, a personalized storefront and/or media reader is presented to a user based upon the users login and account information, which identifies the user, and other information (e.g., tracked history) if available. Personalization can also be carried out to control the manner in which information is provided to a user. For instance, if a user reads certain sections or articles of a particular magazine first on a recurring basis, a reader application presented to the user can provide these sections first, and can further prioritize these sections (e.g., by downloading these sections before others, unless a user specifically selects another section). Such a download approach may, for example, involve providing a contents page first to facilitate user review. Tracking may include, for example, tracking a user's use as well as history of purchases across all devices linked to the user's account, for tailoring the storefront and display as well as providing advertising. This tracking can be further saved with subscribing user profiles, and accessed to present information to a user.

Media content such as magazines may be grouped into subject, style and/or type, to provide recommendations to users based upon the groupings. A unified magazine reading environment can be provided to facilitate such grouping. Other groupings may be carried out by pricing or access-level type tier, which may be attributable to one or more of a publisher, title, and type of access (e.g., as may pertain to a type of device used to access the content, and the manner in which access to the content is provided).

In some embodiments, media content access is shared among users and/or devices. For example, excerpts of magazine issues can be selected and provided for access by others, with the access controlled by the system. This shared-user access can be further provided with various advertising information, such as information for purchasing a magazine from which content was shared.

Sharing, marketing and usage data can be gathered and processed to provide information and/or services to media content providers and/or other business stakeholders. For example, usage patterns at a particular reader can be used to tailor the type of content, the manner in which content is provided and/or other characteristics. Similarly, use patterns for particular media content, such as the manner in which a user reads a digital magazine, can also be used to provide such services.

Cross-platform cross-device sales and content delivery of the magazines are facilitated as well, to provide user's access to content on various device types. For example, a user may have an entitlement granting him/her access to a digital magazine. That user may access the magazine using different devices, such as a laptop computer and a smart phone type of handheld device. Each of these devices may operate on different platforms. In this context, access is provided to the user, via offerings tailored to the specific devices and platforms. For example, different types of content may be provided based upon the device type, and capabilities of the device, or as related to the capabilities of the device's connectivity to receive content.

Complimentary media and other communications for the media content brands offered in the store are also provided, in accordance with various embodiments. Different content is delivered to different canvasses (e.g., television, tablet, computer), which can be consumed on individual devices or in multi-screen modes in which complementary content and a user interface (UI) can exist. For instance, related content can be simultaneously provided on a user's tablet and on a television that the user is interacting with. Such examples may involve, for example, providing embedded images for display on a television while a user is reading text on a tablet. Another example involves providing linked text when other media content, such as audio or video, is being provided (e.g., display information regarding music as it is being played, or display information regarding a movie as the movie is being watched).

Costs are managed and processed in a variety of manners. In some embodiments, delivery costs such as may pertain to rich content (e.g., higher bandwidth) are tracked and charged back to one or both of a content provider and a user. Other content delivery costs, such as those that may pertain to management of the delivery, are also tracked and charged accordingly. Various of these and related aspects are implemented in connection with usage metrics, as may be applied to flat-rate type content access across multiple titles, one or more publishers and one or more types of content access.

Other embodiments are directed to search functions for searching media content, such as magazine content, to which a user is entitled access and/or to content that the user is not entitled access (e.g., until purchased). For example, a user wishing to read articles about a certain topic can search for the topic, browse results and choose results to view/read. For search results including articles that the user is entitled to view (via profile/subscription data), access is provided. For search results including articles that the user is not entitled to view, access can be provided using a purchase-type of approach. These search features can be tailored/limited to the user's entitlement as well, such as by limiting the search to a particular magazine title or titles and issue(s), to which the user is entitled to view.

Various other embodiments are directed to a publisher portal system that provides system access to publishers making media content available to users. The publisher portal is configured to provide access to the publisher for tailoring the display of media content to suit particular needs, such as to tailor the content for users or groups of users, particular titles, or type of media.

When a publisher wants to add a title, such as when a publisher provides titles A, B and C, is currently using only A and B and wants to add C, the publisher provides information such as art assets and metadata about the content (e.g., magazine). Art assets are things like a logo for the title, and metadata can include descriptive information about various aspects of that title, and that text is displayed to the user. Accordingly, if the user is looking at a list of titles in the store, they'll see their title, in this case Title C, with a textual description next to it. Where applicable, codes such as magazine codes are associated with each title, with the publisher providing data indicating what magazine code matches the title, as well as what fulfillment house handles print fulfillment for the title.

From a digital upgrade perspective, if a publisher wants to offer a digital upgrade to a customer, the print fulfillment house is queried to test that entitlement (where print fulfillment houses are used). The system identifies a title that the user is trying to get a digital upgrade for, maps that title to a print fulfillment house and a magazine code, and queries the appropriate print fulfillment house. Accordingly, appropriate data is provided by or extracted from publishers to suit these functions.

A payment platform is also populated upon the addition of a title, with a link formed between a product and offer and payment platform, as well as usage metric data. Billing plans may be implemented for various access/subscription types, such as for a single issue purchase, a six-month subscription, or an annual subscription, which may involve one-time, monthly or other billing, and can further involve incentives such as price breaks for volume. Correspondingly, such subscriptions can be time-based. Further, certain approaches are directed to the termination of a subscription, in which payments are terminated and/or refunds are provided as may be appropriate. Billing plans can be generated from offer details that come from a publisher and as applied to multi-publisher offerings. Accordingly, when a title is added, one or more sets of data pertaining to offer details is obtained/established. Such data may pertain to types of offers that will be presented to users for purchasing access to content, and as is relative to flat-rate content access across multiple titles and/or publishers, with various prices associated with the content access.

In addition to metadata and graphics that are used for certain types of media content, additional information is received and used for each particular content item that is offered. For example, when a new issue comes out, such as a new month's issue for a magazine, assets for that particular issue are obtained and used in providing the media content (e.g., preview information such as a thumbnail of the cover and/or table of contents may be offered to entice a sale). For instance, a UI can show covers of various magazines and, when the cover of a particular magazine is clicked on or rolled over, the UI transitions the cover to a table of contents view. This content may be provided at a host system, or via some other system to which a link is made, and can also be provided (or at least displayed for potential access) based upon a multi-title or multi-publisher access control configuration.

In some implementations, media content is provided with advertisements that are based upon information for the user, either as obtained via usage patterns and/or via the user's profile as may be stored with a host system. Further, this advertisement may be tailored to fit with a particular type of media content, such as by coupling or embedding advertising within predefined portions of media. One such implementation is directed to the display of advertisements within a magazine that is provided to a user via the display of an electronic device. The magazine contents are arranged in a predefined pattern, or in a pattern set according to certain rules (e.g., set by the publisher for desirable display of information), with other image regions reserved for display of advertising. Advertising may be presented in these other image regions by fitting the advertisements to available space and further selecting the advertisements based on one or more of the available space (e.g., and advertiser requirements), user information, user location (e.g., as obtained via a user's mobile device) and media content type. For instance, the advertising may be tailored to the user's proximity to a particular retail outlet as may be reported via GPS or other positioning circuits, such as by displaying an advertisement for coffee when the user is reading a magazine near a coffee shop.

In some implementations, advertisements presented with a particular set of media content, such as a digital magazine, are inserted by host system. Advertising entities contract with the host system for displaying information. Media content providers may specify when, how or the type of advertising that can be displayed. The host system uses this information together with information about the user to generate and display advertising in an embedded type of manner. For instance, when a user subscribes to a particular magazine, the publisher may specify a manner in which its articles are to be provided for reading by the user, with agreed-upon advertising space (e.g., standard advertising sizes and locations, or specific locations and sizes). The host system then fills these advertising spaces with advertisements for the advertising entities, charges a fee to the advertising entities and passes a portion of the fee onto the publisher.

Using this approach, the publisher is freed from any need to interact with advertisers, and the advertisers can then access advertising needs across different titles and different publishers. For example, if a particular chain of restaurants is local to a single city or a limited number of cities, that restaurant may purchase advertising based upon user profile information (e.g., trending) as well as geographical location, rather than advertise in a single title or issue. This trending may involve, for example, the user's use of a reader application as well as location history. Date and time data may also be used to further tailor advertising information, such as to advertise a daily special, a particular event, or a time-based advertisement. In this context, local advertising can be provided to wide-scale publications. An advertisement processing engine implemented with the host system can accordingly take in various data types, such as user profiles, publisher profiles, advertiser profiles, geographic information and time information, process the information and provide a tailored advertising package. The collective ability to advertise in magazine space differently in different regions, for different users, at different times and on different dates can be used to target advertising more closely to an expected use.

A more particular embodiment is directed to displaying information for products that are alternative products, or available from alternative sources, relative to a product as shown/advertised. For example, if an article being displayed at an end-user device concerns a particular type of goods, such as fashion or automotive goods, information regarding similar products available for purchase can be provided to the user.

When a user accesses information, the information can be provided in one or more of a variety of manners. For example, when a subscriber accesses a digital magazine, the access may involve downloading information on an article-by-article basis, to a subset of articles, to articles across issues, or to an entire issue or issues. Users may execute a clip function to save a clipped article from a particular issue on a user device.

Various example embodiments are directed to the determination of metrics as related to a user-based choice of a set number (e.g., three) titles over a predefined access period. Usage metrics are apportioned based upon the accessed titles and the respective access periods pertaining to each title. Where appropriate, weighting information is used for the respective titles in various manners, such as by weighting usage pertaining to the set number accessed during a single access period, or to respective titles as accessed during different access periods. Flat rate-based allocation can be used across accessed titles.

Other example embodiments are directed to device-specific access. For instance, different sets of media content can be provided for user access on different devices, based upon an access configuration for the particular user and respective devices. Usage metrics may incorporate device-specific metrics and related data, and be apportioned and/or weighted accordingly. For instance, access to content on certain devices with enhanced interactivity (e.g., screen size, functionality) may be limited to a high-level subscription access, whereas access to the content in a limited manner on devices having relatively lower interactivity (e.g., small screens and limited interactive components) may be facilitated via a lower-level subscription access.

Figure 2:
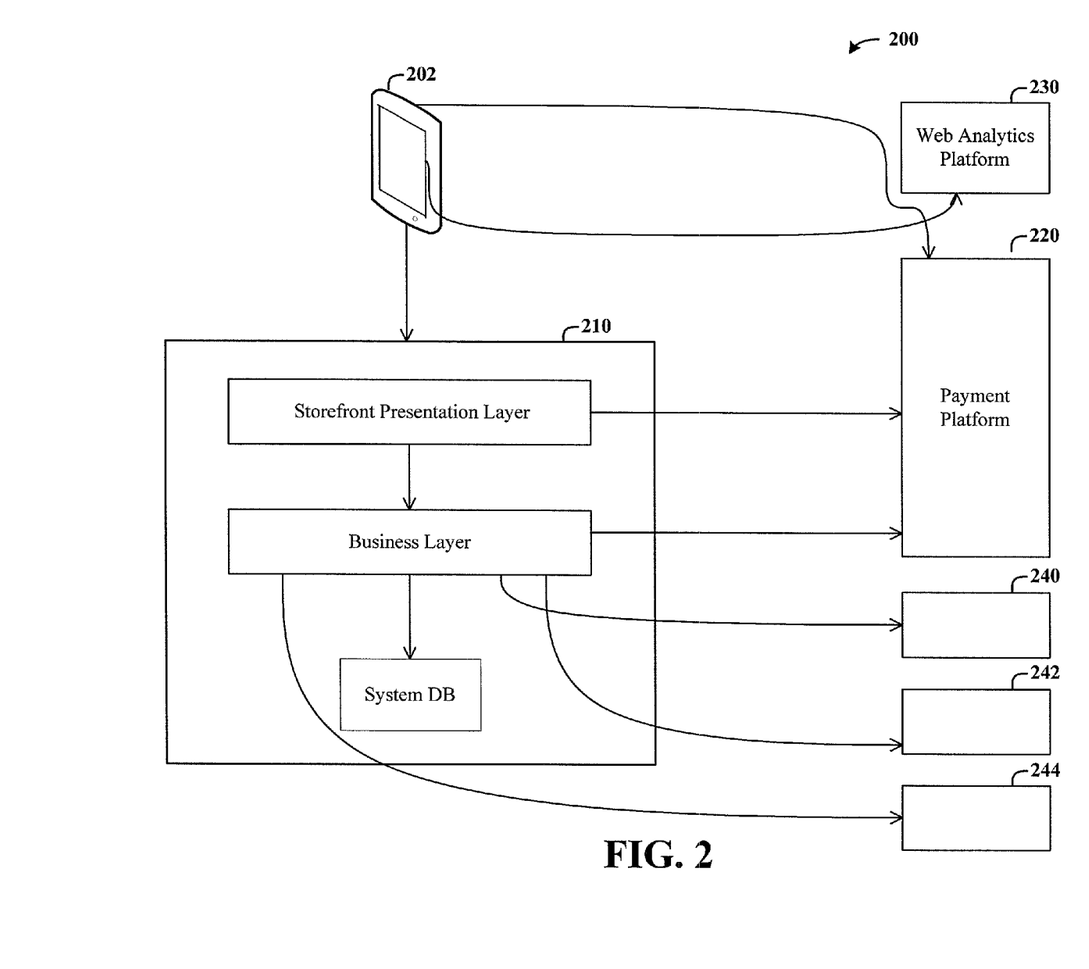
FIG. 2 shows a data-flow type diagram, in accordance with other example embodiments of the present invention.

Returning to the figures, FIG. 2 shows a data-flow type diagram 200 exemplifying interaction between a reader storefront module 210 and other components in a content access system for providing content to a multitude of user devices such as device 202, in accordance with other example embodiments. The storefront module 210 communicates with device 202 using an API and various calls such as log in, log out, access requests, data for building the storefront such as a request for current issues, current offer prices, back issues, and others that a user may browse. When a user navigates a store presented via the storefront module 210, analytics data is recorded and used for tailoring the store for a user or users.

When a user goes to make a purchase, such as by subscribing to a flat-rate type of content access across multiple titles and/or multiple publishers, a store module communicates with a storefront module to indicate that a purchase flow function has been entered. The storefront module 210 communicates with a payment platform module 220 to alert the payment platform to incoming information, and the payment platform module returns an ID for the transaction that is about to happen. A web form that contains the ID as a hidden field is created and served back to the user device 202 where it is presented to the user entering payment information, which is submitted back to the payment platform module 220, which redirects the user back to a host server, to a URL that has been provided (e.g., one for success and one for failure). The transaction ID is used to query the payment platform module 220 for whether the transaction was a success or failure, on one or more levels.

An auto-bill update function may be implemented to set up and commit a particular transaction. Entitlement is carried out in a manner such as described herein and/or in the above-referenced provisional patent application, via one or more print fulfillment houses 240, 242 and 244. A web analytics platform module 230 may also be implemented to carry out various analytics functions, as may pertain to media content access and that is also used for usage metrics attributable to and implemented by the payment platform module 220 for apportioning access to different publishers (as well as related access rates/fees). Various other aspects of data flow as shown may be implemented in accordance with one or more embodiments.

Figure 3:
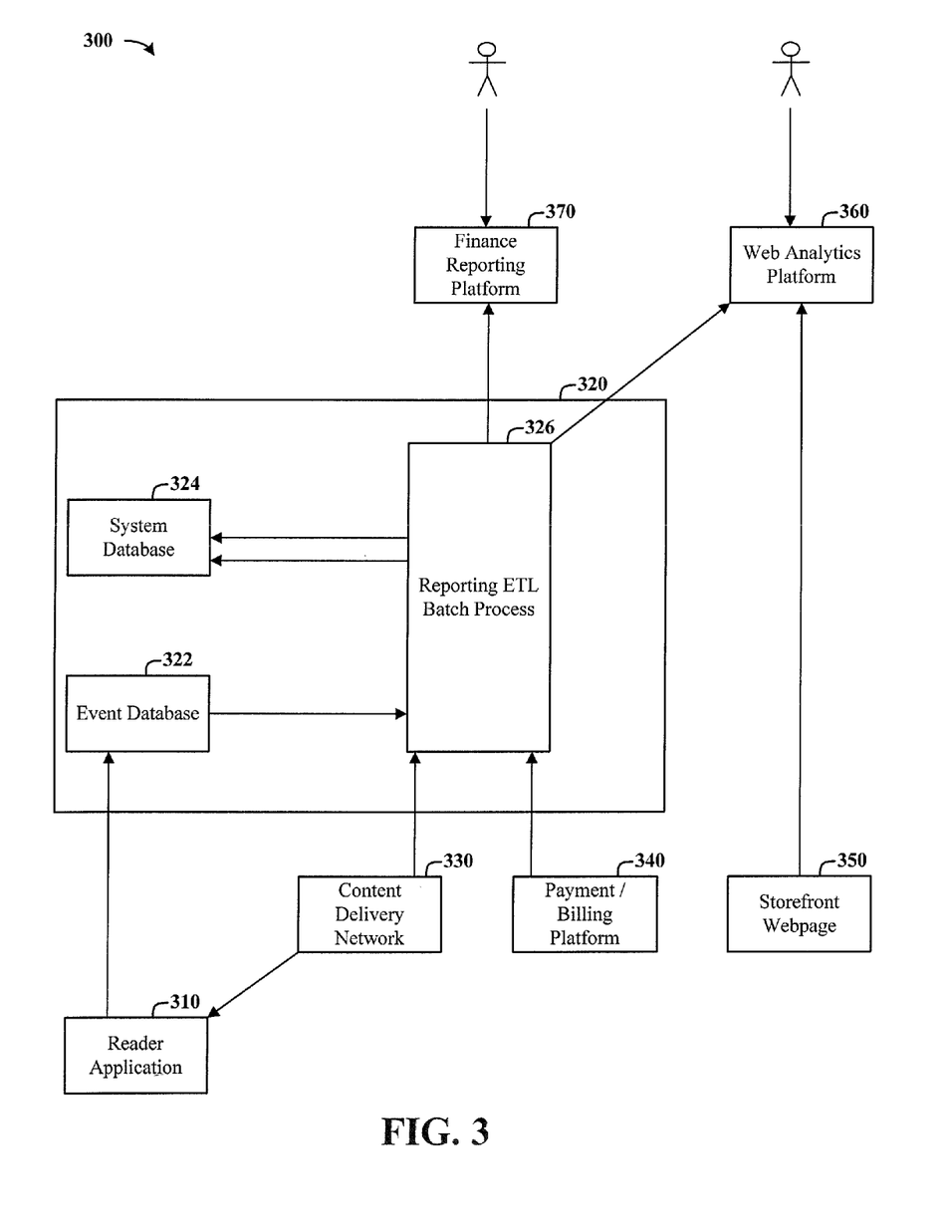
FIG. 3 shows a data flow diagram for providing media content with usage metric allocation, in accordance with another example embodiment of the present invention.

FIG. 3 shows a system 300/data flow diagram for providing media content with usage metric allocation, in accordance with another example embodiment of the present invention. A native reader application 310 is configured with an end user device to provide digital magazine content for consumption (viewing/access) by an end user. The reader application 310 queues activity records in the device based upon one or more user actions, such as to start reading a magazine, turning a magazine page, stop reading, and others. When the device has network connectivity, the reader application transmits the activity records to a host device 320, which writes the activity records to a database 322 for future processing. The host device 320 also includes a system database 324, and a reporting module 326.

Magazine content is delivered to the reader application 310 from a content delivery network 330. The content delivery network 330 tracks the URL, total bytes transferred, and any applicable error code for each delivery to the reader application 310. Periodically, the content delivery network 330 delivers a report of all content downloaded by reader applications (including reader application 310) to the host device 320, which stores the data for future processing. A payment/billing module 340 maintains purchase and recurring billing information, and operates to extract this data from the reporting module 326.

A storefront module 350 provides an interface to an end user for accessing media content. For example, the storefront module may present an interface for browsing available content, making purchases, and viewing and manipulating account information. This interface may be presented, for example, via navigation of a collection of web pages through a web browser, and can be instrumented with web analytics tags in order to report usage patterns.

The reporting module 326 accesses job data from the database 322, and extracts events used to compute any dwell time values. As used herein, dwell time is time during which media content is active on an end-user device (e.g., time during which a periodical is active on an end-user device). The events are queued for delivery to a web analytics module 360. Dwell time values are written to the system database 324. The reporting module 326 also accesses job finance data from the system database 324 and from the payment module 340, with dwell time values being part of the data set extracted from the system database 324. The data is processed (e.g., reformatted) and queued for delivery to a finance reporting module 370. The queued events and job finance data are respectively delivered to the web analytics module 360 and the finance reporting module 370 at an appropriate time. Finance and/or usage pattern reports can then be created and run via the web analytics module 360.

The reader module 310 can be implemented in one or more of a variety of manners. In some embodiments, the reader module 310 includes the following functional blocks. A presentation piece block presents media content at a reader device, based on stored rule data relating to the presentation of content (e.g., and advertising), and device capabilities. A download engine block manages the retrieval and archiving of media content, in a manner such as described above. An upload block reports information back to the host device 320, such as dwell time, content accessed and more. In some implementations, the reporting is timed based on a cyclic schedule, and/or is event-based (e.g., report upon closing out of an article or an entire reader application), and event collection can be separate from downloading. A library block displays content accessible by the user. A rendering block looks for resources needed for selected media content and communicates these needs (e.g., to the download engine block). An events module periodically uploads event data.

Some or all of the components shown in FIG. 3 may be implemented together or separately, depending upon the application. For instance, some embodiments are directed to the host device 320, and other embodiments are directed to the reader application 310. Other embodiments are directed to a larger system including the host device 320 and one or more other components, such as the content delivery network 330.

Various embodiments as presented herein may be implemented in accordance with one or more apparatuses, systems, methods and other approaches as described and/or shown in the above-referenced provisional patent application, to which priority is claimed. For example, various embodiments are directed to apportioning user metrics that may be implemented with the system shown in FIG. 1 of the above-referenced provisional patent application, with regard to the presentation of media content for access and coordinating the delivery thereof. For instance, the various functional blocks may be implemented as software modules executed on one or more networked processors, or implemented on separate processors respectively carrying out different functions (e.g., different processors on a network and/or with processors in an end device operated by a user for accessing content). Data flow between functional blocks may be effected in various manners as well.

In addition, various aspects as shown in FIG. 1 of the above-referenced provisional application may be implemented using one or more approaches as described herein, such as shown in the figures. For instance, data corresponding to apportioned user metrics can be used as an input to modules as may be implemented with a payment platform and other functions for providing payment (e.g., software and service). Such modules may be implemented to effect payment across multiple publishers according to metric data for one or more users. Other aspects of the system shown in FIG. 1 of the provisional application may be implemented for modules related to those discussed herein, in connection with the provision of content relating to the user metrics and other data (e.g., aspects of the instant disclosure may be implemented in connection with web analytics and other aspects shown in FIG. 1).

Various modules may be implemented to carry out one or more of the operations and activities described herein and/or shown in the figures. In these contexts, a "module" is a circuit that carries out one or more of these or related operations/activities (e.g., delivery of media content, monitoring/tracking of content access). For example, in certain of the above-discussed embodiments, one or more modules are discrete logic circuits or programmable logic circuits configured and arranged for implementing these operations/activities, as in the circuit modules shown in FIGS. 1, 2 and/or 3. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

The systems and functions shown in the figures and described above in connection with the figures and otherwise can be implemented in a variety of manners. In some implementations, shopping sites are integrated with media delivery, to provide access to shopping functions together with related media content. For instance, where a fashion magazine type of media content is provided, advertising included with the media content can be linked to fashion-based shopping sites, or to other sites often visited by those viewing the fashion magazine.

Various embodiments described above, in the above-cited provisional patent application (including the Appendix therein) to which benefit is claimed, and shown in the figures may be implemented together and/or in other manners. One or more of the items depicted in the drawings/figures can also be implemented in a more separated or integrated manner, or removed and/or rendered as inoperable in certain cases, as is useful in accordance with particular applications. For instance, various functions can be carried out by controlling a remote device, such as by controlling a remote end-user device to calculate metric data and/or data useful therefor. In view of the description herein, those skilled in the art will recognize that many changes may be made thereto without departing from the spirit and scope of the present disclosure.

What is claimed is:

1. An apparatus comprising:
a first circuit-based module configured and arranged to
authenticate remote-user interface circuits by processing authentication criteria communicated from the remote-user interface circuits with stored authentication data, and
for each authenticated remote-user interface circuit, provide remote access to a plurality of different sets of media content via the remote-user interface circuit based upon stored media content authorization data associated with the remote-user interface circuit and provide said remote access to different sets of media content by controlling non-linear delivery of portions of periodical-based media content to the remote-user interface circuit, based upon historical access to previous versions of the periodical-based media content by a user associated with the authentication criteria communicated from the remote-user interface circuit; and
a second circuit-based module connected to the first circuit-based module and configured and arranged to, for each authenticated remote-user interface circuit and a time-based period during which the remote-user interface circuit accesses at least one of the different sets of media content as indicated via the connection to the first circuit-based module,
communicate with the remote-user interface circuit to receive time-stamped usage data that characterizes time periods during which remote users access different sets of the media content via the remote-user interface circuit, and
for each of the remote users, apportion a usage metric characterizing usage of the respective sets of media content based upon the time-stamped usage data and one of a plurality of different weighting factor data associated with the accessed media content, each of the plurality of different weighting factor data being respectively associated with different sets of media content.

2. The apparatus of claim 1, wherein the second circuit-based module is configured and arranged to
apportion the usage metric for each authenticated remote-user interface circuit by using the weighting factor data and time-stamped usage data as inputs, and
attribute respective portions of the usage metric to different sets of the media content based upon a weighting factor assigned to each set of media content, time-stamped usage data for each set of media content, and time-stamped usage data for all sets of media content accessed by the remote-user interface circuit during the time-based period, wherein the weighting factor data assigns different values to different ones of the sets of media content and are used to provide time-independent weighted indications respectively based on the different sets of media content.

3. The apparatus of claim 1, further including a third circuit-based module configured and arranged to, for each set of media content to which access is provided at one of the remote-user interface circuits, configure the display of the media content based upon at least one display characteristic of the remote-user interface circuit and display configuration data assigned to the media content.

4. The apparatus of claim 3, wherein the at least one display characteristic of the remote-user interface circuit and display configuration data assigned to the media content include at least one of: a data format requirement of the remote-user interface circuit, a display size of the remote-user interface circuit, display preference requirements specified for the provision of the media content to remote-user interface devices, and integrated third-party data to be displayed with the media content at the remote-user interface circuit.

5. The apparatus of claim 1, wherein the second circuit-based module is further configured and arranged to
apportion the usage metric for each authenticated remote-user interface circuit based upon a weighting factor that corresponds to one of the plurality of different weighting factor data, by apportioning the usage metric based upon the weighting factor for a media content tier with which the set of media content is associated, wherein at least one of the sets of media content is associated with a tier that is different than a tier with which at least another one of the sets of media content is associated.

6. The apparatus of claim 1, wherein the second circuit-based module is configured and arranged to, for each user identification (ID) and media content subscription data therefore, generate the usage metric for attributing a portion of a fixed value metric to respective media content providers that provide the respective sets of media content.

7. The apparatus of claim 1, wherein the first circuit-based module is configured and arranged to provide remote access to a plurality of different sets of media content by providing respective sets of media content via different remote media content provider circuits communicatively coupled with the first circuit-based module over a network.

8. The apparatus of claim 1, wherein the second circuit-based module is configured and arranged to communicate with multiple remote-user interface circuits, and to apportion the usage metric by apportioning a usage metric for all remote-user interface circuits assigned to a common grouping identification and therein provide a usage metric corresponding to an entire group of remote user-interface devices.

9. The apparatus of claim 1, wherein
the first circuit-based module is configured and arranged to provide remote access to the plurality of different sets of media content by providing access to the sets of content, in different formats, for different remote-user interface circuits that use common authentication data, the formats being selected based on a display characteristic of the specific remote-user interface circuit to which the content is provided in the particular format, and
the second circuit-based module is configured and arranged to apportion the usage metric based upon at least one of the format of the respective sets of content and the display characteristic of the respective remote-user interface circuits to which the content is provided.

10. The apparatus of claim 1, wherein at least one of the first and second circuit-based modules is configured and arranged to carry out the respective operations by communicating with a remote networked circuit to control the remote networked circuit to carry out the operations.

11. The apparatus of claim 1, wherein the first circuit-based module is configured and arranged to provide said remote access based upon geographical data received from the remote-user interface circuit, the geographical data indicating a geographical location of the remote-user interface circuit.

12. An apparatus comprising:
a first circuit-based module configured and arranged to
authenticate remote-user interface circuits by processing authentication criteria communicated from the remote-user interface circuits with stored authentication data, and
for each authenticated remote-user interface circuit, provide remote access to a plurality of different sets of media content via the remote-user interface circuit based upon stored media content authorization data associated with the remote-user interface circuit and provide said remote access to different sets of media content by controlling non-linear delivery of portions of periodical-based media content to the remote-user interface circuit, based upon historical access to previous versions of the periodical-based media content by a user associated with the authentication criteria communicated from the remote-user interface circuit; and
a second circuit-based module configured and arranged to, for each authenticated remote-user interface circuit and a time-based period during which the remote-user interface circuit accesses the different sets of media content,
communicate with the remote-user interface circuit to receive time-stamped usage data that characterizes use of the media content at the remote-user interface circuit, and
apportion a usage metric characterizing active usage of the respective sets of media content based upon stored weighting factor data for each set of media content and the time-stamped usage data, the time-stamped usage data indicating at least one of: dwell time at the remote-user interface circuit during access of the media content, a background/foreground condition of the display of the media content at the remote-user interface circuit, and an awake/sleep status of the remote-user interface circuit.

13. An apparatus comprising:
a first module configured and arranged to interface with a remote content-providing circuit over a network communication link, to provide authentication criteria to the content-providing circuit and to receive media content access information from the content-providing circuit, the media content access information being indicative of content available at the apparatus based upon the authentication criteria;
a second module coupled to the first module and configured and arranged to present the media content access information for interaction by a user, identify a set of media content for local access at the apparatus based upon user input, retrieve the identified set of media content from the content-providing circuit via the first module, and present the retrieved media content for access by the user; and
a third module configured and arranged to collect time-stamped usage data that characterizes the user's active access to the presented retrieved media content, and communicate data corresponding to the collected time-stamped usage data to the content-providing circuit via the first module based upon a trigger event at the apparatus, wherein the first, second and third modules are configured and arranged to provide remote access to different sets of media content by controlling non-linear delivery of portions of periodical-based media content to a remote-user interface circuit, based upon historical access to previous versions of the periodical-based media content by a user associated with the authentication criteria communicated from the remote content-providing circuit.

14. The apparatus of claim 13, wherein the third module is configured and arranged to, for a time-based period during which the retrieved media content is accessed by the user, apportion a usage metric characterizing usage of the media content based upon stored time-independent weighting factor data for each set of media content and the time-stamped usage data, and to communicate data corresponding to the collected time-stamped usage data by communicating the usage metric.

15. The apparatus of claim 13, wherein the third module is configured and arranged to apportion a usage metric characterizing usage of the media content by executing an algorithm to, using weighting factor data and the time-stamped usage data as inputs, attribute respective portions of the usage metric to different sets of the retrieved media content based upon a weighting factor assigned to each set of media content, time-stamped usage data for each set of media content, and time-stamped usage data for all sets of the retrieved media content during a time-based period.

16. The apparatus of claim 13, wherein the third module is configured and arranged to communicate data corresponding to the collected time-stamped usage data based upon a trigger event corresponding to a time period for periodic communication of the data.

17. The apparatus of claim 13, wherein the third module is configured and arranged to communicate data corresponding to the collected time-stamped usage data based upon a trigger event corresponding to an interaction between the apparatus and the user.

18. The apparatus of claim 13, wherein the third module is configured and arranged to apportion a usage metric characterizing usage of the media content by apportioning the usage metric based upon a weighting factor for a media content tier with which the retrieved media content is associated, wherein the retrieved media content includes at least one set of media content associated with a tier that is different than a tier with which at least another set of media content is associated.

19. A method comprising:
authenticating remote-user interface circuits by processing authentication criteria communicated from the remote-user interface circuits with stored authentication data;
for each authenticated remote-user interface circuit, providing remote access to a plurality of different sets of media content via the remote-user interface circuit based upon stored media content authorization data associated with the remote-user interface circuit, including the step of controlling non-linear delivery of portions of periodical-based media content to the remote-user interface circuit, based upon historical access to previous versions of the periodical-based media content by a user associated with the authentication criteria communicated from the remote-user interface circuit; and
for each authenticated remote-user interface circuit and a time-based period during which the remote-user interface circuit accesses the different sets of media content, communicating with the remote-user interface circuit to receive time-stamped usage data that characterizes use of the media content at the remote-user interface circuit, and
apportioning a usage metric characterizing usage of the respective sets of media content based upon stored weighting factor data for each set of media content and the time-stamped usage data.

20. The method of claim 19, wherein apportioning a usage metric includes executing an algorithm to, using the weighting factor data and time-stamped usage data as inputs, attribute respective portions of the usage metric to different sets of the media content based upon a weighting factor assigned to each set of media content, time-stamped usage data for each set of media content, and time-stamped usage data for all sets of media content accessed by the remote-user interface circuit during the time-based period.

21. The method of claim 19, wherein apportioning a usage metric includes apportioning the usage metric based upon a weighting factor for a media content tier with which the set of media content is associated, wherein at least one of the sets of media content is associated with a tier that is different than a tier with which at least another one of the sets of media content is associated.

22. The method of claim 19, wherein apportioning a usage metric includes generating, for each user ID and media content subscription data therefor, the usage metric for attributing a portion of a fixed value metric to respective media content providers that provide the respective sets of media content.

23. The method of claim 19, wherein apportioning a usage metric includes apportioning a usage metric for all remote-user interface circuits assigned to a common grouping identification and therein provide a usage metric corresponding to the entire group of remote user-interface circuits.

24. The method of claim 19, wherein apportioning a usage metric includes apportioning a usage metric based upon at least one of a format of respective sets of content and a display characteristic of respective remote-user interface circuits to which the content is provided.

25. The method of claim 19, wherein apportioning a usage metric includes apportioning the usage metric based upon time-stamped usage data indicating at least one of: dwell time at the remote-user interface circuit during access of the media content, a background/foreground condition of the display of the media content at the remote-user interface circuit, and an awake/sleep status of the remote-user interface circuit.

26. The apparatus of claim 1, wherein the first circuit-based module is configured and arranged to provide remote access to a plurality of different sets of media content via the remote-user interface circuit by, in response to the stored media content authorization data associated with the remote-user interface circuit, transmitting portions of at least one of the sets of media content to the remote user-interface circuit.

27. The apparatus of claim 1, wherein the time-stamped usage data includes data indicative of a total time of active user interaction with the media content at the remote-user interface circuit.

28. The apparatus of claim 13, wherein the third module is configured and arranged to collect time-stamped usage data by monitoring user interaction with the media content in real time, and collecting data indicative of a total time that the user interacts with the media content.

29. The apparatus of claim 13, wherein the second module is configured and arranged with the first module to present the retrieved media content for access by the user by retrieving, from the content-providing circuit, respective portions of the retrieved media content for active display to the user.

30. The method of claim 19, wherein providing remote access includes, at a circuit remote from the remote-user interface circuit, accessing the media content authorization data and, based upon the authorization data, sending respective portions of the media content to the remote-user interface circuit for active display to a user in response to media content requests received from the remote-user interface circuit.

31. The method of claim 19, wherein the time-stamped usage data includes data indicating a period of time during which a user actively interacts with the media content at the remote-user interface circuit.

* * * * *